(12) United States Patent
Kobayashi et al.

(10) Patent No.: US 11,873,623 B2
(45) Date of Patent: Jan. 16, 2024

(54) WORK MACHINE AND METHOD OF CONTROLLING THE SAME

(71) Applicant: KOMATSU LTD., Tokyo (JP)

(72) Inventors: Shintaro Kobayashi, Tokyo (JP); Yuki Arai, Tokyo (JP); Takeshi Kamimae, Tokyo (JP)

(73) Assignee: KOMATSU LTD., Tokyo (JP)

( * ) Notice: Subject to any disclaimer, the term of this patent is extended or adjusted under 35 U.S.C. 154(b) by 798 days.

(21) Appl. No.: 16/971,530

(22) PCT Filed: Feb. 26, 2019

(86) PCT No.: PCT/JP2019/007334
§ 371 (c)(1),
(2) Date: Aug. 20, 2020

(87) PCT Pub. No.: WO2019/207947
PCT Pub. Date: Oct. 31, 2019

(65) Prior Publication Data
US 2021/0087791 A1    Mar. 25, 2021

(30) Foreign Application Priority Data
Apr. 26, 2018 (JP) .................. 2018-085243

(51) Int. Cl.
  *E02F 9/22* (2006.01)
  *B62D 6/02* (2006.01)
  *B62D 12/00* (2006.01)
  *E02F 3/76* (2006.01)

(52) U.S. Cl.
  CPC .............. *E02F 9/225* (2013.01); *B62D 6/02* (2013.01); *B62D 12/00* (2013.01); *B60Y 2200/411* (2013.01); *E02F 3/7663* (2013.01)

(58) Field of Classification Search
  CPC ....... E02F 9/225; E02F 3/7663; E02F 9/2289; E02F 9/2292; E02F 3/7636; E02F 3/841; E02F 9/0841; E02F 9/2296; B62D 6/02; B62D 12/00; B60Y 2200/411; B60K 17/36
  See application file for complete search history.

(56) References Cited

U.S. PATENT DOCUMENTS 3,791,540 A * 2/1974 Breitfuss ............. B66F 9/07545
                                                              280/638
4,204,697 A * 5/1980 Santerre ............... B62D 63/065
                                                              280/149.2
5,213,177 A * 5/1993 May ....................... B60L 3/102
                                                              701/84

(Continued)

FOREIGN PATENT DOCUMENTS

CN          1132813 A          10/1996
CN          1688473 A          10/2005

(Continued)

*Primary Examiner* — Mussa A Shaawat
(74) *Attorney, Agent, or Firm* — Faegre Drinker Biddle & Reath LLP

(57) ABSTRACT

A controller controls a first drive source and a second drive source based on a moving speed of a motor grader measured by a speed sensor and a turning angular velocity of the motor grader measured by an IMU, to thereby independently control a rotation speed of each of a right front wheel and a left front wheel.

4 Claims, 7 Drawing Sheets

(56) References Cited

U.S. PATENT DOCUMENTS

| | | | | |
|---|---|---|---|---|
| 5,535,124 | A * | 7/1996 | Hosseini | B62D 11/08 180/197 |
| 5,865,512 | A * | 2/1999 | Meiser | E02F 9/2025 180/197 |
| 5,879,124 | A * | 3/1999 | Brouwer | B66F 9/10 180/209 |
| 6,065,556 | A * | 5/2000 | Andrews | E02F 9/0808 180/209 |
| 6,283,237 | B1 * | 9/2001 | Muller | B62D 12/00 180/235 |
| 6,409,457 | B1 * | 6/2002 | Korycan | E02F 9/0808 180/242 |
| 6,631,320 | B1 * | 10/2003 | Holt | E02F 9/2253 180/197 |
| 8,602,153 | B2 * | 12/2013 | Osswald | B62D 21/14 180/209 |
| 2006/0042838 | A1 * | 3/2006 | Yeoman | B62D 12/00 180/6.2 |
| 2008/0116001 | A1 * | 5/2008 | Graeve | B62D 5/093 180/441 |
| 2011/0040460 | A1 * | 2/2011 | Velde | B60L 3/104 701/50 |
| 2012/0029780 | A1 | 2/2012 | Foussard et al. | |
| 2013/0068544 | A1 | 3/2013 | Itou et al. | |
| 2015/0120145 | A1 * | 4/2015 | Han | B62D 7/148 701/43 |
| 2016/0016582 | A1 * | 1/2016 | Han | B62D 7/159 701/41 |
| 2017/0037602 | A1 * | 2/2017 | Spielman | E02F 3/431 |
| 2018/0057044 | A1 * | 3/2018 | Gao | B62D 6/002 |
| 2020/0057444 | A1 * | 2/2020 | Fritz | G05D 1/0088 |
| 2020/0369257 | A1 * | 11/2020 | Hu | B60W 10/20 |
| 2021/0140139 | A1 * | 5/2021 | Matsuyama | B60K 17/356 |

FOREIGN PATENT DOCUMENTS

| | | |
|---|---|---|
| CN | 202294951 U | 7/2012 |
| CN | 103057587 A | 4/2013 |
| JP | 2524994 B2 | 8/1996 |
| JP | 2002-010405 A | 1/2002 |
| JP | 2003-013419 A | 1/2003 |
| JP | 4148017 B2 | 9/2008 |
| JP | 4561189 B2 | 10/2010 |
| JP | 2011-245988 A | 12/2011 |
| JP | 2012-518571 A | 8/2012 |
| JP | 2017-172187 A | 9/2017 |
| WO | WO 2004/024537 A1 | 3/2004 |
| WO | WO-2017/061888 A1 | 4/2017 |

* cited by examiner

FIG.6
SPEED-UP RATIO TABLE FOR FRONT WHEEL SPEED RELATIVE
TO REAR WHEEL SPEED

| | | | ARTICULATION ANGLE | | | | | | |
|---|---|---|---|---|---|---|---|---|---|
| | | | LEFT ARTICULATION | | | NEUTRAL | RIGHT ARTICULATION | | |
| | | | LARGE | MEDIUM | SMALL | 0 | SMALL | MEDIUM | LARGE |
| REAR WHEEL TURNING RADIUS | RIGHT TURN | SMALL | | | | | | | R34 |
| | | ↑ | | | | R03 | R13 | R23 | R33 |
| | | ↓ | | | | R02 | R12 | R22 | R32 |
| | | LARGE | | | | R01 | R11 | R21 | R31 |
| | NEUTRAL (STRAIGHT LINE TRAVEL) | | 1.00 | 1.00 | 1.00 | 1.00 | 1.00 | 1.00 | 1.00 |
| | LEFT TURN | LARGE | L31 | L21 | L11 | L01 | | | |
| | | ↑ | L32 | L22 | L12 | L02 | | | |
| | | ↓ | L33 | L23 | L13 | L03 | | | |
| | | SMALL | L34 | | | | | | |

WORK MACHINE AND METHOD OF CONTROLLING THE SAME

TECHNICAL FIELD

The present disclosure relates to a work machine and a method of controlling the same.

BACKGROUND ART

US Patent Application Publication No. 2006/0042838 (PTL 1) describes independently adjusting the speeds of front wheels based on a steering angle or a combination of steering and articulation angles, in a work machine such as a motor grader. By independently controlling the right and left front wheels during a turn of the work machine in this manner, a loss of traction from at least one of the front wheels during the turn is suppressed.

CITATION LIST

Patent Literature

PTL 1: US Patent Application Publication No. 2006/0042838

SUMMARY OF INVENTION

Technical Problem

In the work vehicle described in the above publication, however, a steering angle sensor is installed in the vicinity of the front wheels, and is therefore susceptible to failure due to soil and the like.

An object of the present disclosure is to provide a work machine in which a loss of traction from front wheels can be suppressed, and in which a measurement device is not susceptible to failure, and a method of controlling the same.

Solution to Problem

A work machine of the present disclosure includes: a right front wheel and a left front wheel; a speed sensor; a measurement device; a first drive source; a second drive source; and a controller. The speed sensor measures a moving speed of the work machine. The measurement device measures a turning angular velocity acting on the work machine during movement of the work machine. The first drive source provides driving force to the right front wheel. The second drive source provides driving force to the left front wheel. The controller controls the first drive source and the second drive source based on the moving speed of the work machine measured by the speed sensor and the turning angular velocity measured by the measurement device, to thereby independently control a rotation speed of each of the right front wheel and the left front wheel.

A method of controlling a work machine of the present disclosure is a method of controlling a work machine having a right rear wheel and a left rear wheel, and include the following steps.

A moving speed of the work machine is measured. A turning angular velocity acting on the work machine during movement of the work machine is measured. A rotation speed of each of the right front wheel and the left front wheel is independently controlled based on the measured moving speed and the measured turning angular velocity.

Advantageous Effects of Invention

According to the present disclosure, a work machine in which a loss of traction from front wheels can be suppressed, and in which a measurement device is not susceptible to failure, and a method of controlling the same can be implemented.

BRIEF DESCRIPTION OF DRAWINGS

FIG. 6 shows a front wheel speed-up ratio table for determining a target front wheel speed-up ratio for each of a right front wheel and a left front wheel from the turning radius of the rear wheel and an articulation angle.

DESCRIPTION OF EMBODIMENTS

Figure 1:
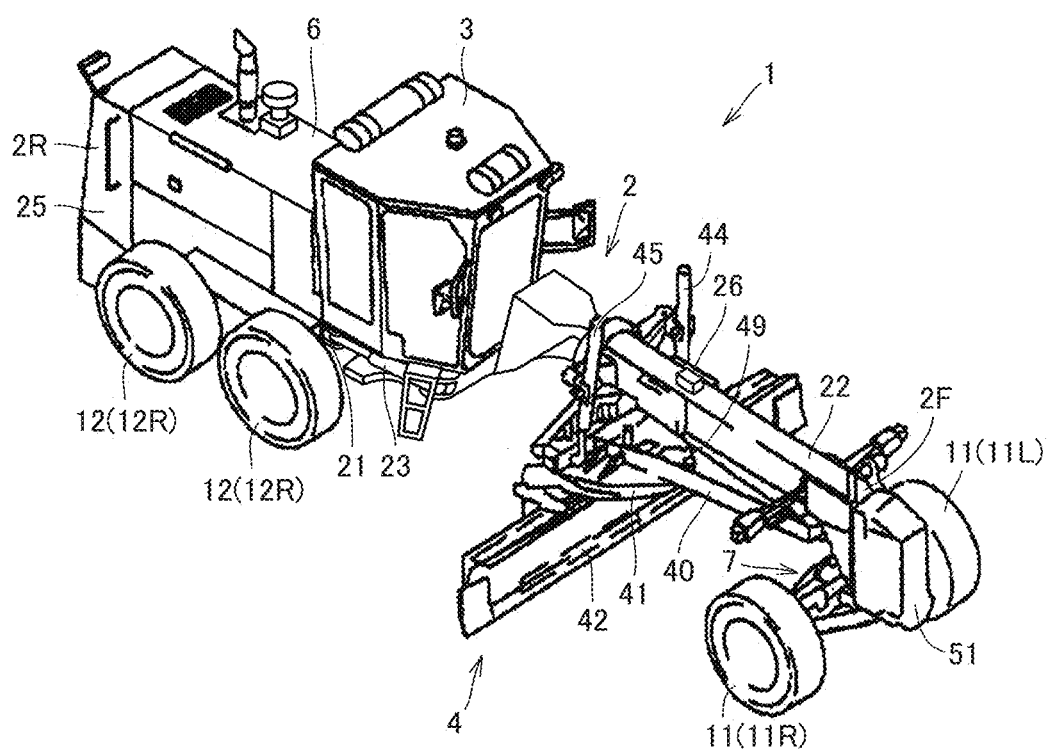
FIG. 1 is a perspective view schematically showing the construction of a motor grader in one embodiment.

In the following, a work machine according to an embodiment of the present disclosure will be described based on the drawings. The same elements have the same reference characters allotted in the description below and their labels and functions are also the same. Therefore, detailed description thereof will not be repeated.

<Construction of Motor Grader>

Initially, a description will be given of the construction of a motor grader as an example of a work machine to which the concept of the present disclosure is applicable.

FIG. 1 is a perspective view schematically showing the construction of a motor grader in one embodiment. As shown in FIG. 1, a motor grader 1 in the present embodiment mainly includes running wheels 11, 12, a body frame 2, a cab 3, and a work implement 4. Motor grader 1 also includes components such as an engine arranged in an engine compartment 6. Work implement 4 includes a blade 42, for example. Motor grader 1 can do such works as land-grading works, snow removal works, and mixing of materials with blade 42.

In the description of the drawings below, a direction in which motor grader 1 travels in straight lines is referred to as a fore/aft direction of motor grader 1. In the fore/aft direction of motor grader 1, a side where front wheel 11 is arranged with respect to work implement 4 is defined as the fore direction. In the fore/aft direction of motor grader 1, a side where rear wheel 12 is arranged with respect to work implement 4 is defined as the aft direction. A lateral direction of motor grader 1 is a direction orthogonal to the fore/aft direction in a plan view. A right side and a left side in the lateral direction in facing front are defined as a right direction and a left direction, respectively. An upward/downward direction of motor grader 1 is a direction orthogonal to the plane defined by the fore/aft direction and the lateral direction. A side in the upward/downward direction where the ground is located is defined as a lower side and a side where the sky is located is defined as an upper side.

Running wheels 11 and 12 include front wheel 11 and rear wheel 12. Front wheel 11 includes a right front wheel 11R and a left front wheel 11L one on each of the right and left sides. Rear wheel 12 includes two right rear wheels 12R and two left rear wheels 12L (FIG. 2) two on each of the right and left sides. The number and the arrangement of front wheels 11 and rear wheels 12 are not limited to the example shown in FIG. 1.

Body frame 2 extends in the fore/aft direction. Body frame 2 includes a rear frame 21 and a front frame 22.

Rear frame 21 supports an exterior cover 25 and components such as the engine arranged in engine compartment 6. Exterior cover 25 covers engine compartment 6. For example, each of four rear wheels 12 is attached to rear frame 21. Each of four rear wheels 12 can be rotatably driven by driving force from the engine.

Front frame 22 is attached in front of rear frame 21. Front frame 22 is pivotably coupled to rear frame 21. Front frame 22 extends in the fore/aft direction. Front frame 22 includes a base end portion coupled to rear frame 21 and a tip end portion opposite to the base end portion. The base end portion of front frame 22 is coupled to a tip end portion of rear frame 21 by means of a vertical central pin. Front frame 22 is formed of a single beam.

An articulation cylinder 23 is attached between front frame 22 and rear frame 21. Front frame 22 is provided as being pivotable (articulatable) with respect to rear frame 21 as a result of extension and retraction of articulation cylinder 23.

For example, two front wheels 11 are rotatably attached to the tip end portion of front frame 22. Front wheel 11 is attached as being revolvable with respect to front frame 22 as a result of extension and retraction of a steering cylinder 7. Motor grader 1 can change a direction of travel as a result of extension and retraction of steering cylinder 7.

A counter weight 51 is attached to a front end 2F of body frame 2. Counter weight 51 represents one type of attachments to be attached to front frame 22. Counter weight 51 is attached to front frame 22 in order to increase a downward load to be applied to front wheel 11 to allow steering and to increase a pressing load on blade 42.

Cab 3 is carried on front frame 22, for example. In cab 3, an operation portion (not shown) such as a steering wheel, a gear shift lever, a lever for controlling work implement 4, a brake, an accelerator pedal, and an inching pedal is provided. Cab 3 may be carried on rear frame 21. Running wheels 11, 12, body frame 2, and cab 3 form a vehicular body (machine body).

Work implement 4 mainly includes a drawbar 40, a swing circle 41, and blade 42, for example. Drawbar 40 is disposed below front frame 22. Drawbar 40 has a front end portion coupled to the tip end portion of front frame 22 by means of a ball bearing portion. The front end portion of drawbar 40 is swingably attached to the tip end portion of front frame 22.

Drawbar 40 has a rear end portion supported on front frame 22 (a part of the vehicular body) by a pair of lift cylinders 44 and 45. As a result of extension and retraction of the pair of lift cylinders 44 and 45, the rear end portion of drawbar 40 can move up and down with respect to front frame 22. Drawbar 40 is also swingable with an axis extending in the fore/aft direction being defined as the center, as a result of extensions and retractions of the pair of lift cylinders 44 and 45 that are different from each other.

Swing circle 41 is disposed below front frame 22. Swing circle 41 is disposed below drawbar 40. Swing circle 41 is revolvably (rotatably) attached to the rear end portion of drawbar 40. Swing circle 41 can be driven by a hydraulic motor 49 as being revolvable clockwise or counterclockwise with respect to drawbar 40 when viewed from above the vehicle. Blade 42 is provided on swing circle 41. As swing circle 41 is driven to revolve, a blade angle of blade 42 is adjusted. The blade angle is an angle of inclination of blade 42 with respect to the fore/aft direction of motor grader 1 when viewed from above the vehicle.

Blade 42 is disposed between front wheel 11 and rear wheel 12. Front wheel 11 is disposed in front of blade 42. Rear wheel 12 is disposed behind blade 42. Blade 42 is disposed between front end 2F of body frame 2 and a rear end 2R of body frame 2. Blade 42 is supported on swing circle 41. Blade 42 is supported on drawbar 40 with swing circle 41 interposed therebetween. Blade 42 is supported on front frame 22 with drawbar 40 interposed therebetween.

The pair of lift cylinders 44 and 45 suspends drawbar 40 with respect to the vehicular body. Specifically, the pair of lift cylinders 44 and 45 supports blade 42 located below front frame 22 (a part of the vehicular body), with drawbar 40 interposed therebetween. As a result of extension and retraction of the pair of lift cylinders 44 and 45, the heights of drawbar 40 and blade 42 can be changed.

As described above, blade 42 is configured to be able to move up and down with respect to the vehicle, and to be able to swing with the axis extending in the fore/aft direction being defined as the center, with drawbar 40 and swing circle 41 interposed therebetween.

Figure 2:
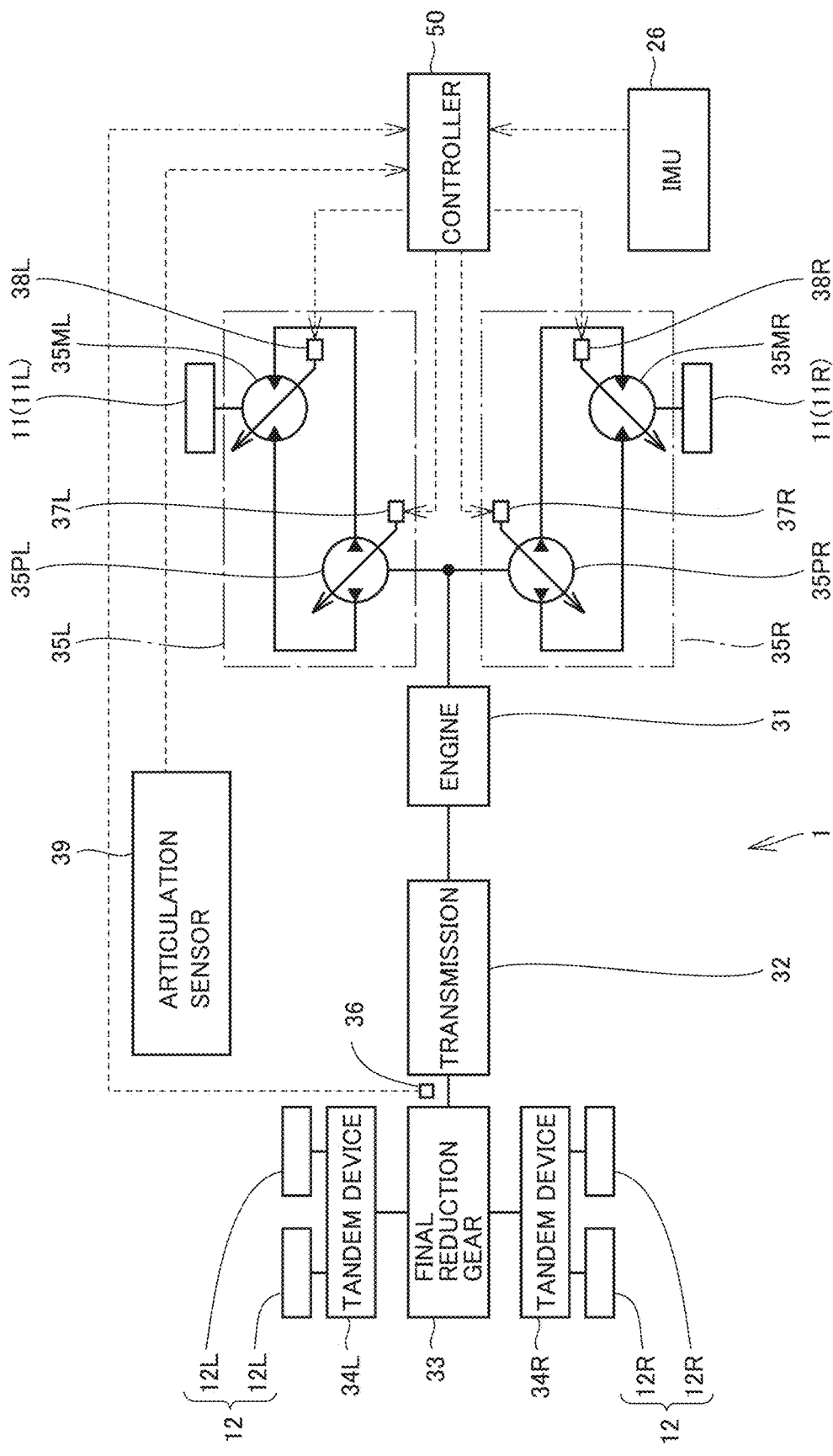
FIG. 2 schematically shows a configuration related to control of drive of running wheels in the motor grader in one embodiment.

FIG. 2 schematically shows a configuration related to control of drive of the running wheels in the motor grader in one embodiment. As shown in FIG. 2, motor grader 1 in the present embodiment includes running wheels 11, 12, an engine 31, a transmission 32, a final reduction gear 33, tandem devices 34R, 34L, a first drive source 35R, and a second drive source 35L.

Engine 31 is supported on rear frame 21 shown in FIG. 1. To one output side of engine 31, final reduction gear 33 is connected with transmission 32 interposed therebetween. To final reduction gear 33, right tandem device 34R and left tandem device 34L are connected.

To right tandem device 34R, the pair of right rear wheels 12R is connected. To left tandem device 34L, the pair of left rear wheels 12L is connected. Engine 31 drives right rear wheels 12R and left rear wheels 12L with transmission 32, final reduction gear 33 and tandem devices 34R, 34L interposed therebetween.

To the other output side of engine 31, first drive source 35R and second drive source 35L are connected. Each of first drive source 35R and second drive source 35L is a hydraulic system. First drive source 35R drives right front wheel 11R. Second drive source 35L drives left front wheel 11L.

First drive source 35R includes a right hydraulic pump 35PR and a right hydraulic motor 35MR (first motor). Second drive source 35L includes a left hydraulic pump 35PL and a left hydraulic motor 35ML (second motor). Each of right hydraulic pump 35PR and left hydraulic pump 35PL is driven by the output of engine 31 transferred thereto. Each of right hydraulic pump 35PR and left hydraulic pump 35PL is a swash-plate axis pump, for example.

Right hydraulic motor 35MR is driven with hydraulic oil discharged from right hydraulic pump 35PR so as to provide driving force to right front wheel 11R. Left hydraulic motor 35ML is driven with hydraulic oil discharged from left hydraulic pump 35PL so as to provide driving force to left front wheel 11L. Each of hydraulic motors 35MR and 35ML is a swash-plate axis motor, for example. Note that each of hydraulic motors 35MR and 35ML may be a radial-piston motor.

Motor grader 1 in the present embodiment further includes an IMU (Inertial Measurement Unit) 26, a speed sensor 36, solenoids 37R, 37L, 38R, 38L, an articulation sensor 39, and a controller 50.

Speed sensor 36 detects a moving speed (traveling speed) during movement (during travel) of motor grader 1, and generates a signal of the moving speed. The signal of the moving speed generated at speed sensor 36 is output to controller 50.

Speed sensor 36 measures a rotation speed of an output shaft of transmission 32, for example. Speed sensor 36 may detect the moving speed of motor grader 1 using a GPS (Global Positioning System), for example.

IMU 26 (measurement device) detects a turning angular velocity acting on motor grader 1 during movement (during travel) of motor grader 1, and generates a signal of the turning angular velocity. The signal of the turning angular velocity generated at IMU 26 is output to controller 50.

If IMU 26 is attached to a portion that operates relative to body frame 2, such as work implement 4 or tandem devices 34R, 34L, the turning angular velocity of motor grader 1 cannot be measured by IMU 26. Thus, IMU 26 is attached to body frame 2 of motor grader 1, or a portion that does not operate relative to body frame 2.

For IMU 26 to be less affected by soil and the like, it is preferable to dispose IMU 26 at a position distant from running wheels 11, 12 and work implement 4. From the viewpoint of being less affected by soil and the like, IMU 26 is preferably attached to front frame 22 as shown in FIG. 1, for example. IMU 26 is particularly preferably attached to an upper surface of front frame 22.

Right pump solenoid 37R controls an amount of hydraulic oil discharged from right hydraulic pump 35PR to right hydraulic motor 35MR, by changing the angle of a pump swash plate in right hydraulic pump 35PR. Left pump solenoid 37L controls an amount of hydraulic oil discharged from left hydraulic pump 35PL to left hydraulic motor 35ML, by changing the angle of a pump swash plate in left hydraulic pump 35PL. Solenoids 37R and 37L control hydraulic pumps 35PR and 35PL, respectively, based on control signals provided from controller 50.

Right motor solenoid 38R controls a rotation speed of right front wheel 11R by changing the angle of a motor swash plate in right hydraulic motor 35MR. Left motor solenoid 38L controls a rotation speed of left front wheel 11L by changing the angle of a motor swash plate in left hydraulic motor 35ML. Solenoids 38R and 38L control hydraulic motors 35MR and 35ML, respectively, based on control signals provided from controller 50.

Note that if each of hydraulic motors 35MR and 35ML is a radial-piston motor, the rotation speeds of front wheels 11R and 11L are controlled by changing the number of pistons to which the hydraulic oil is supplied, out of a plurality of circumferentially disposed and radially extending pistons.

Articulation sensor 39 detects an articulation angle (coupling angle) between front frame 22 and rear frame 21, and generates an articulation angle signal. The articulation angle signal generated at articulation sensor 39 is output to controller 50.

<Configuration of Controller 50>

Figure 3:
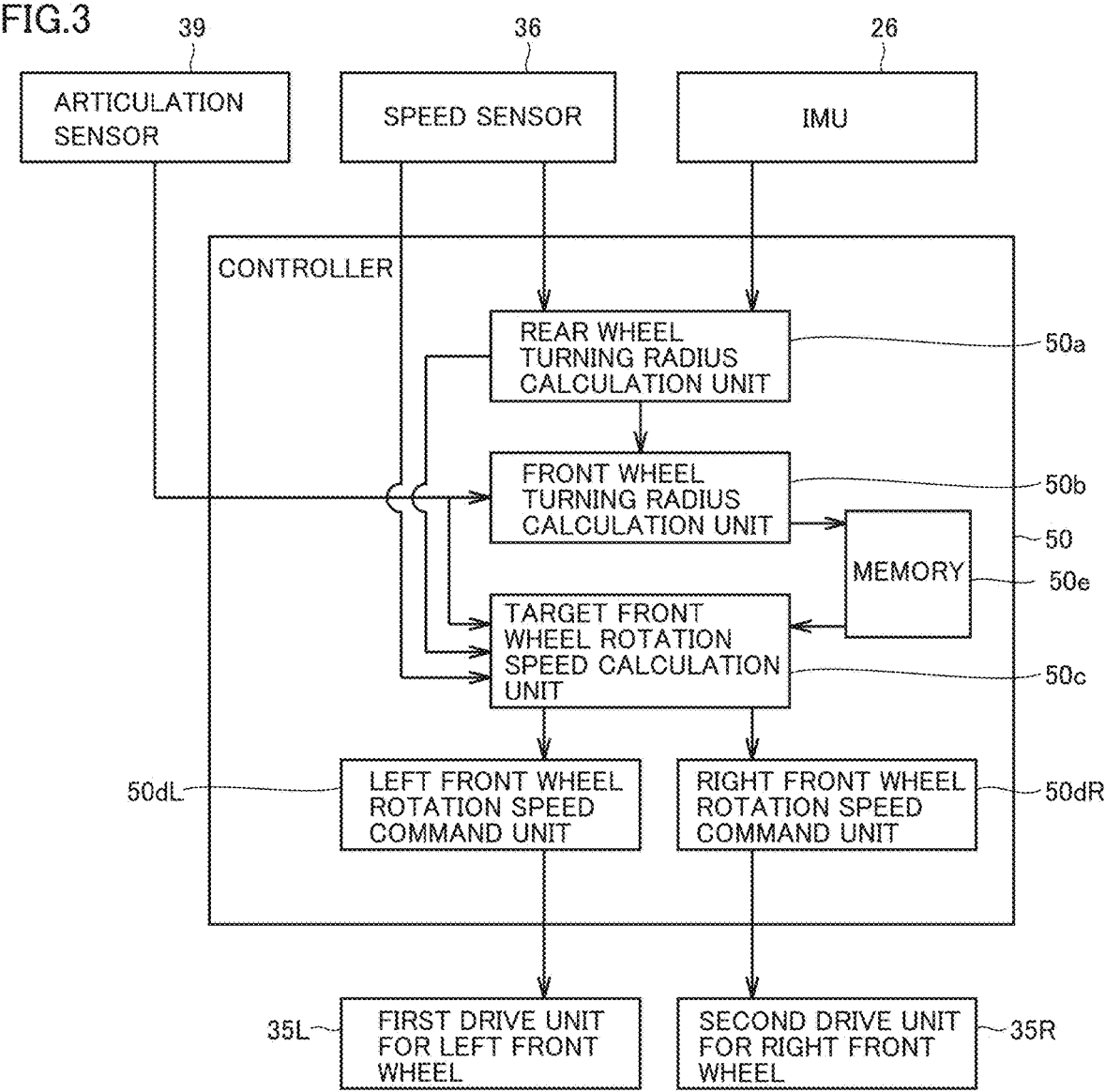
FIG. 3 is a functional block diagram showing functions of a controller in the motor grader in one embodiment.

FIG. 3 is a functional block diagram showing functions of controller 50 in the motor grader in one embodiment. As shown in FIG. 3, controller 50 includes a rear wheel turning radius calculation unit 50a, a front wheel turning radius calculation unit 50b, a target front wheel rotation speed calculation unit 50c, a right front wheel rotation speed command unit 50dR, a left front wheel rotation speed command unit 50dL, and a memory 50e.

Based on the moving speed of motor grader 1 measured at speed sensor 36 and the turning angular velocity measured at IMU 26, rear wheel turning radius calculation unit 50a calculates a turning radius of rear wheel 12 including right rear wheels 12R and left rear wheels 12L. Rear wheel turning radius calculation unit 50a outputs the calculated turning radius of rear wheel 12 to front wheel turning radius calculation unit 50b.

Based on the turning radius of rear wheel 12 calculated by rear wheel turning radius calculation unit 50a, and the articulation angle sensed by articulation sensor 39, front wheel turning radius calculation unit 50b calculates a turning radius of right front wheel 11R and a turning radius of left front wheel 11L. Based on the calculated turning radius of each of right front wheel 11R and left front wheel 11L, the turning radius of rear wheel 12 calculated by rear wheel turning radius calculation unit 50a, and the articulation angle sensed by articulation sensor 39, front wheel turning radius calculation unit 50b creates a front wheel speed-up ratio table (FIG. 6). Front wheel turning radius calculation unit 50b outputs the created front wheel speed-up ratio table to memory 50e.

Memory 50e stores the front wheel speed-up ratio table. The front wheel speed-up ratio table defines a front wheel speed-up ratio corresponding to a rear wheel turning radius and an articulation angle, as shown in FIG. 6, for example. The details of this front wheel speed-up ratio table will be described later. The front wheel speed-up ratio is a value obtained by dividing a front wheel turning radius by a rear wheel turning radius (front wheel turning radius/rear wheel turning radius). This memory 50e may be located outside of controller 50.

Target front wheel rotation speed calculation unit 50c calculates a target front wheel rotation speed of each of right front wheel 11R and left front wheel 11L. Specifically, this is performed as described below.

Target front wheel rotation speed calculation unit 50c calculates a turning radius as a target for each of right front wheel 11R and left front wheel 11L (target front wheel turning radius) from a determined target front wheel speed-up ratio and the rear wheel turning radius.

Based on the speed from speed sensor 36, and the target front wheel speed-up ratio for each of right front wheel 11R and left front wheel 11L calculated as above, target front wheel rotation speed calculation unit 50c calculates a rotation speed as a target for each of right front wheel 11R and left front wheel 11L (target front wheel rotation speed).

Target front wheel rotation speed calculation unit 50c outputs the calculated target front wheel rotation speed of right front wheel 11R to right front wheel rotation speed command unit 50dR. Target front wheel rotation speed calculation unit 50c also outputs the calculated target front wheel rotation speed of left front wheel 11L to left front wheel rotation speed command unit 50dL.

Based on the target front wheel rotation speed signal of right front wheel 11R output from target front wheel rotation speed calculation unit 50c, right front wheel rotation speed command unit 50dR controls first drive source 35R of right front wheel 11R. Based on the target front wheel rotation speed signal of left front wheel 11L output from target front wheel rotation speed calculation unit 50c, left front wheel rotation speed command unit 50dL controls second drive source 35L of left front wheel 11L.

As stated above, controller 50 controls first drive source 35R and second drive source 35L based on the moving speed measured at speed sensor 36 and the turning angular velocity measured at IMU 26, to thereby independently control the rotation speed of each of right front wheel 11R and left front wheel 11L.

<Method of Calculating Turning Radius of Rear Wheel and Turning Radius of Front Wheel>

A method of calculating a turning radius of a rear wheel and a turning radius of a front wheel is now described with reference to FIGS. 4 and 5.

Figure 4:
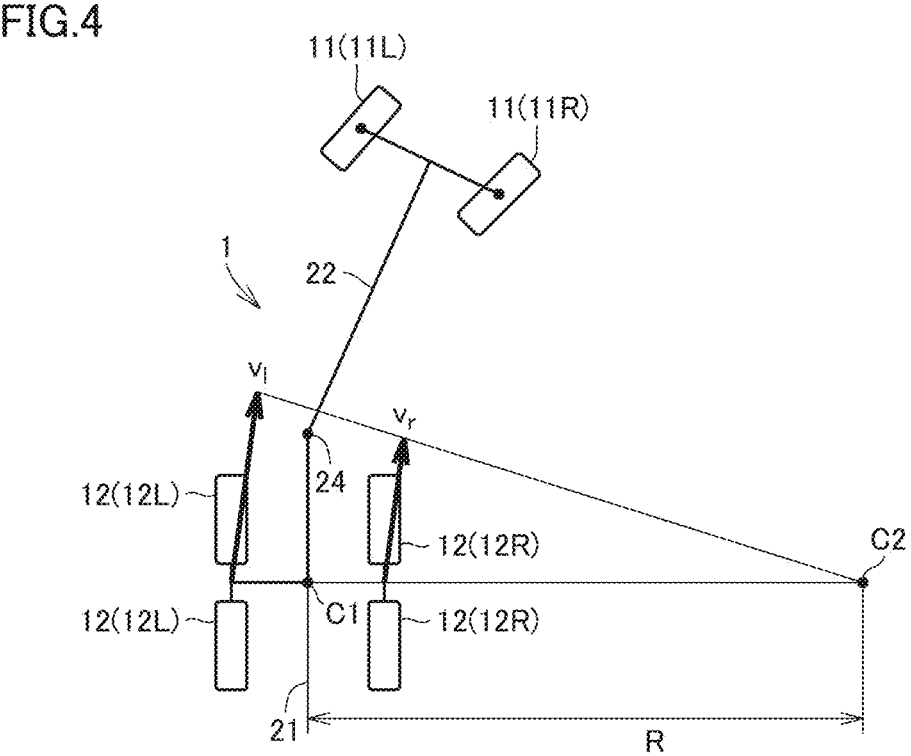
FIG. 4 is a diagram to illustrate a turning radius of a rear wheel.

FIG. 4 is a diagram to illustrate a turning radius of a rear wheel. FIG. 5 is a diagram to illustrate formulas for calculating a turning radius of a front wheel.

As the turning radius of the rear wheel, a turning radius of a rear wheel center is determined. The turning radius of the rear wheel center as used here means a turning radius R of a center (rear wheel center) C1 of right rear wheels 12R and left rear wheels 12L, as shown in FIG. 4. Note that FIG. 4 shows a state where motor grader 1 is performing a right turn, with a rotation speed $v_r$ of right rear wheels 12R being smaller than a rotation speed $v_l$ of left rear wheels 12L.

In the state described above, turning radius R of rear wheel center C1 is measured by dividing the moving speed or motor grader 1 measured at speed sensor 36 by the turning angular velocity measured at IMU 26. That is, turning radius R of rear wheel center C1 is calculated in the following formula:

Turning radius $R$ of rear wheel center $C1$=(Moving speed measured at speed sensor 36)/(Turning angular velocity measured at IMU 26)      Formula (A)

While a right turn state of motor grader 1 has been described above, the turning radius of the rear wheel center is similarly determined during a left turn as well.

A turning radius $R_r$ of right front wheel 11R is calculated by substitution of turning radius R of rear wheel center C1 into the following Formula 1, and a turning radius $R_l$ of left front wheel 11L is calculated by substitution of turning radius R of rear wheel center C1 into the following Formula 2:

$$R_r = \sqrt{(R-x_r)^2 + y_r^2}$$     [Formula 1]

$$R_l = \sqrt{(R-x_l)^2 + y_l^2}$$     [Formula 2]

In addition, $x_r$, $y_r$, $x_l$ and $y_l$ indicated in Formula 1 and Formula 2 described above are expressed in the following Formula 3, Formula 4, Formula 5 and Formula 6, respectively:

$$x_r = L_2 \sin\theta_a + \frac{L_3}{2}\cos\theta_a$$     [Formula 3]

$$y_r = L_1 + L_2\cos\theta_a - \frac{L_3}{2}\sin\theta_a$$     [Formula 4]

$$x_l = L_2\sin\theta_a - \frac{L_3}{2}\cos\theta_a$$     [Formula 5]

$$y_l = L_1 + L_2\cos\theta_a + \frac{L_3}{2}\sin\theta_a$$     [Formula 6]

Figure 5:
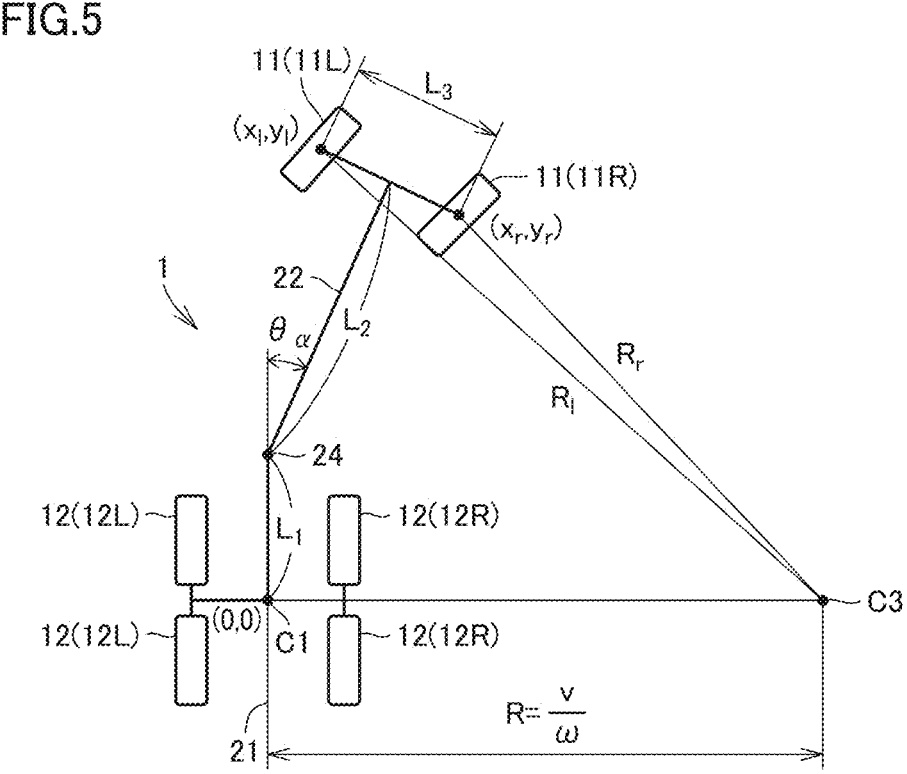
FIG. 5 is a diagram to illustrate formulas for calculating a turning radius of a front wheel.

$L_1$ in Formula 3, Formula 4, Formula 5 and Formula 6 described above represents a distance between rear wheel center C1 and an articulation center 24, as shown in FIG. 5. $L_2$ represents a distance between articulation center 24 and a front accelerator central pin. $L_3$ represents a tread width between right front wheel 11R and left front wheel 11L. In addition, $\theta_a$ represents an articulation angle. Each of $L_1$, $L_2$ and $L_3$ is a numerical value determined by the type of work machine 1.

As stated above, turning radius R of rear wheel center C1 is calculated using Formula (A) described above. Turning radius $R_r$ of right front wheel 11R is calculated using Formula 1 described above. Turning radius $R_l$ of left front wheel 11L is calculated using Formula 2 described above.

<Front Wheel Speed-Up Ratio Table>

The front wheel speed-up ratio table is now described with reference to FIG. 6.

FIG. 6 shows the front wheel speed-up ratio table for determining a front wheel speed-up ratio for each of the right and left front wheels from a turning radius of a rear wheel and an articulation angle. The front wheel speed-up ratio table shown in FIG. 6 defines relation among the turning radius of the rear wheel, the articulation angle, and the front wheel speed-up ratio.

The item of "rear wheel turning radius" in the front wheel speed-up ratio table is divided into items of "right turn," "neutral (straight line travel)" and "left turn." The "right turn" item is divided into four items of "small," "↑", "↓" and "large," for example. The "large" item of the "right turn" defines a relatively large numerical value of turning radius during a right turn, and the "small" item defines a relatively small numerical value of turning radius during a right turn. Each of "↑" and "↓" of the "right turn" defines a numerical value smaller than that of the "large" of the turning radius and larger than that of the "small" of the turning radius. In addition, "↑" of the "right turn" defines a numerical value closer to the "small" of the "right turn" than "↓" of the "right turn."

The "left turn" item is divided into four items of "small," "□", "↓" and "large," for example. The "large" item of the "left turn" defines a relatively large numerical value of turning radius during a left turn, and the "small" item defines a relatively small numerical value of turning radius during a left turn. Each of "↑" and "↓" of the "left turn" defines a numerical value smaller than that of the "large" of the turning radius and larger than that of the "small" of the turning radius. In addition, "↑" of the "left turn" defines a numerical value closer to the "large" of the "left turn" than "↓" of the "left turn."

The item of "articulation angle" is divided into items of "left articulation," "neutral" and "right articulation." The "left articulation" item is divided into three items of "small," "middle" and "large," for example. The "large" item of the "left articulation" defines a relatively large articulation angle during a left articulation. The "small" item of the "left articulation" defines a relatively small articulation angle during a left articulation. The "middle" item of the "left articulation" defines an articulation angle between the "large" and the "small" of the "left articulation."

The "right articulation" item is divided into three items of "small," "middle" and "large," for example. The "large" item of the "right articulation" defines a relatively large articulation angle during a right articulation. The "small" item of the "right articulation" defines a relatively small articulation angle during a right articulation. The "middle" item of the "right articulation" defines an articulation angle between the "large" and the "small" of the "right articulation."

A numerical value of "1.00" in the front wheel speed-up ratio table shown in FIG. 6 is a target front wheel speed-up ratio. Each of L01 to L03, L11 to L13, L21 to L23, L31 to L34, R01 to R03, R11 to R13, R21 to R23, and R31 to R34 defines a numerical value of the target front wheel speed-up ratio corresponding to each machine type.

This front wheel speed-up ratio table shown in FIG. 6 is created for both right front wheel 11R and left front wheel 11L, and stored in memory 50e shown in FIG. 3. While the "right turn" and "left turn" are each divided into four items in the front wheel speed-up ratio table shown in FIG. 6, they may be divided into three or less items, or five or more items. While the items of "left articulation" and "right articulation" are each divided into three items, they may be divided into two or less items, or four or more items.

<Creation of Front Wheel Speed-Up Ratio Table>

The front wheel speed-up ratio table shown in FIG. 6 is created based on a rear wheel turning radius calculated by rear wheel turning radius calculation unit 50a shown in FIG. 3, an articulation angle measured by articulation sensor 39, and a front wheel turning radius calculated by front wheel turning radius calculation unit 50b. Specifically, the table is created from the rear wheel turning radius, the articulation angle, and a front wheel speed-up ratio calculated by dividing the front wheel turning radius by the rear wheel turning radius.

This front wheel speed-up ratio table is created at front wheel turning radius calculation unit 50b shown in FIG. 3, and once created, is output from front wheel turning radius calculation unit 50b to memory 50e, and stored in memory 50e.

<Method of Calculating Target Front Wheel Rotation Speed>

A method of calculating a target front wheel rotation speed is now described.

The calculation of the target front wheel rotation speed is performed at target front wheel rotation speed calculation unit 50c shown in FIG. 3. This target front wheel rotation speed calculation unit 50c refers to the front wheel speed-up ratio table (FIG. 6) stored in memory 50e, and based on the turning radius of rear wheel 12 calculated by rear wheel turning radius calculation unit 50a, and the articulation angle measured by articulation sensor 39, determines a target front wheel speed-up ratio for each of right front wheel 11R and left front wheel 11L. Specifically, when the articulation angle of motor grader 1 shown in FIGS. 4 and 5 is "large" of the "right articulation" shown in FIG. 6, for example, and the rear wheel turning radius is "large" of the "right turn" shown in FIG. 6, for example, then the target front wheel speed-up ratio is determined to be a numerical value defined in "R31".

The target front wheel speed-up ratio determined as described above is a value obtained by dividing a front wheel turning radius as a target (target front wheel turning radius) by the rear wheel turning radius.

While a method of calculating the target front wheel rotation speed using the front wheel speed-up ratio table has been described above, the target front wheel rotation speed may be calculated without using the front wheel speed-up ratio table.

<Method of Controlling Running Wheels 11 and 12>

A method of controlling running wheels 11 and 12 in the motor grader in one embodiment is now described with reference to FIG. 7.

Figure 7:
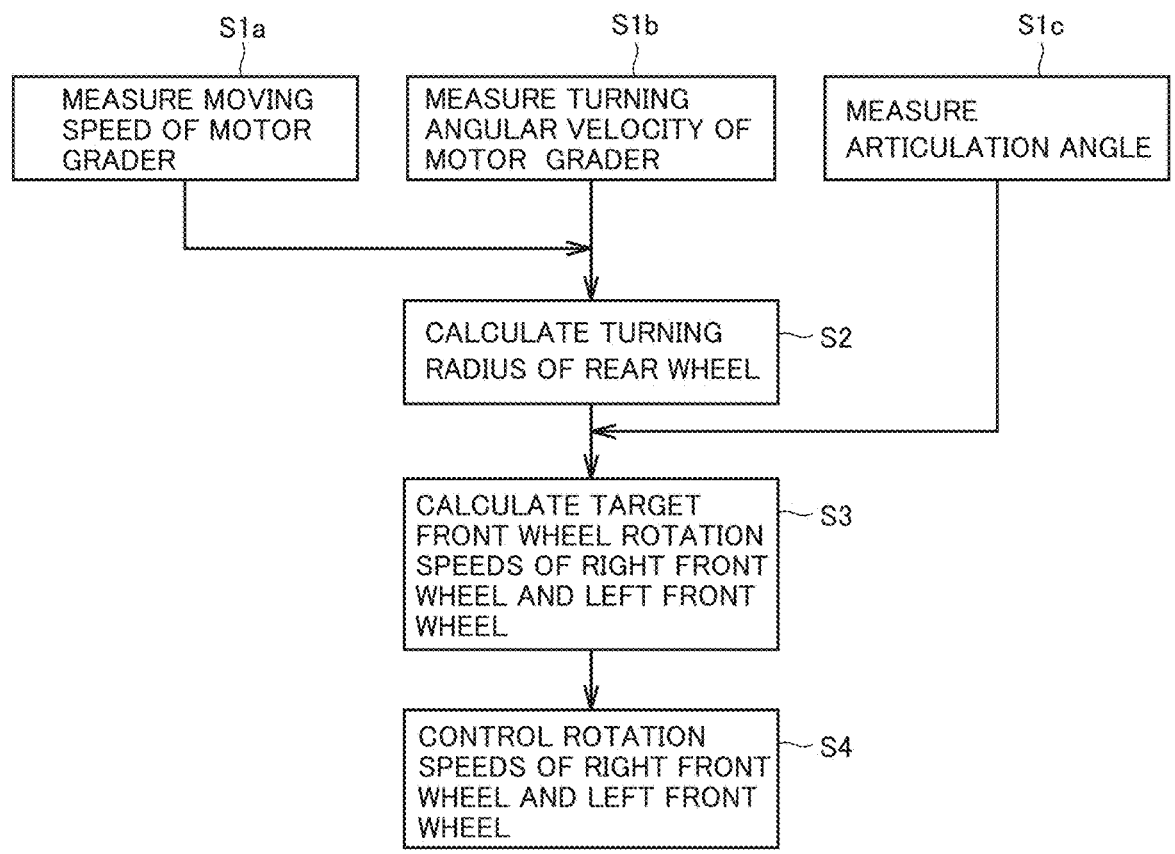
FIG. 7 is a flow diagram showing a method of controlling the running wheels in the motor grader in one embodiment.

FIG. 7 is a flow diagram showing the method of controlling running wheels 11 and 12 in the motor grader in one embodiment. As shown in FIGS. 3 and 7, a moving speed of motor grader 1 is measured by speed sensor 36 (step S1a: FIG. 7). A turning angular velocity in motor grader 1 during movement is measured by IMU 26 (step S1b: FIG. 7). An articulation angle is measured by articulation sensor 39 (step S1c: FIG. 7).

Then, as shown in FIG. 3, a signal of the moving speed measured at speed sensor 36 and a signal of the turning angular velocity measured at IMU 26 are output to rear wheel turning radius calculation unit 50a of controller 50.

In rear wheel turning radius calculation unit 50a, a turning radius of the rear wheel is calculated (step S2: FIG. 7). Specifically, turning radius R of rear wheel center C1 is calculated by substitution of the signal of the moving speed measured at speed sensor 36 and the turning angular velocity measured at IMU 26 into Formula (A) described above.

Then, as shown in FIG. 3, the turning radius of rear wheel 12 calculated at rear wheel turning radius calculation unit 50a is output to target front wheel rotation speed calculation unit 50c. The articulation angle measured by articulation sensor 39 is also output to target front wheel rotation speed calculation unit 50c.

In target front wheel rotation speed calculation unit 50c, a target front wheel rotation speed is determined by reference to the front wheel speed-up ratio table stored in memory 50e (step S3: FIG. 7). Specifically, target front wheel rotation speed calculation unit 50c refers to the front wheel speed-up ratio table stored in memory 50e, and based on the turning radius of rear wheel 12 calculated by rear wheel turning radius calculation unit 50a, and the articulation angle sensed by articulation sensor 39, determines a target front wheel speed-up ratio for each of right front wheel 11R and left front wheel 11L.

The target front wheel speed-up ratio determined as described above is a value obtained by dividing a target front wheel turning radius by a rear wheel turning radius. Thus, the target front wheel rotation speed is calculated based on the target front wheel speed-up ratio and the moving speed.

The target front wheel rotation speed of right front wheel 11R calculated by target front wheel rotation speed calculation unit 50c is output to right front wheel rotation speed command unit 50dR. The target front wheel rotation speed of left front wheel 11L calculated by target front wheel rotation speed calculation unit 50c is output to left front wheel rotation speed command unit 50dL.

Right front wheel rotation speed command unit 50dR controls a rotation speed of right front wheel 11R based on the target front wheel rotation speed of right front wheel 11R, and left front wheel rotation speed command unit 50dL controls a rotation speed of left front wheel 11L based on the target front wheel rotation speed of left front wheel 11L (step S4: FIG. 7).

Specifically, right front wheel rotation speed command unit 50dR outputs a signal for controlling the rotation of right front wheel 11R to at least one of right pump solenoid 37R and right motor solenoid 38R shown in FIG. 2. Right pump solenoid 37R that has received this signal changes the angle of the pump swash plate of right hydraulic pump 35PR. Right motor solenoid 38R that has received this signal changes the angle of the motor swash plate of right hydraulic motor 35MR. The rotation speed of right front wheel 11R is controlled by the change in angle of at least one of the pump swash plate of right hydraulic pump 35PR and the motor swash plate of right hydraulic motor 35MR.

Left front wheel rotation speed command unit 50dL outputs a signal for controlling the rotation of left front wheel 11L to at least one of left pump solenoid 37L and left motor solenoid 38L shown in FIG. 2. Left pump solenoid 37L that has received this signal changes the angle of the pump swash plate of left hydraulic pump 35PL. Left motor solenoid 38L that has received this signal changes the angle of the motor swash plate of left hydraulic motor 35ML. The rotation speed of left front wheel 11L is controlled by the change in angle of at least one of the pump swash plate of left hydraulic pump 35PL and the motor swash plate of left hydraulic motor 35ML.

As stated above, the rotation speed of right front wheel 11R and the rotation speed of left front wheel 11L are independently controlled based on the moving speed and the turning angular velocity of motor grader 1.

Advantageous Effects of Present Embodiment

Advantageous effects of the present embodiment are now described.

In the present embodiment, as shown in FIG. 2, the rotation speed of right front wheel 11R and the rotation speed of left front wheel 11L are independently controlled based on the moving speed and the turning angular velocity of motor grader 1. A loss of traction from front wheel 11 can be suppressed.

Moreover, in the present embodiment, as shown in FIG. 2, the turning angular velocity of motor grader 1 is measured by IMU 26. IMU 26 can basically measure the turning angular velocity of motor grader 1 when attached to any portion of motor grader 1 IMU 26 can thus be disposed at a position less affected by soil and the like, for example, at a position distant from running wheels 11, 12 and work implement 4. A work machine in which IMU 26 is not susceptible to failure and a method of controlling the same can thereby be implemented.

Moreover, in the present embodiment, as shown in FIG. 3, controller 50 calculates the turning radius of rear wheel 12 including right rear wheels 12R and left rear wheels 12L based on the moving speed measured at speed sensor 36 and the turning angular velocity measured at IMU 26. Based on this calculated turning radius of rear wheel 12, the target front wheel rotation speed of each of right front wheel 11R and left front wheel 11L can be calculated.

Moreover, in the present embodiment, as shown in FIG. 3, controller 50 causes target front wheel rotation speed calculation unit 50c to determine the target front wheel turning radius of right front wheel 11R and the target front wheel turning radius of left front wheel 11L based on the calculated turning radius of rear wheel 12, and the articulation angle detected by articulation sensor 39. Based on the target front wheel turning radius of right front wheel 11R and the target front wheel turning radius of left front wheel 11L thus determined, the target front wheel rotation speed of each of right front wheel 11R and left front wheel 11L can be calculated.

Moreover, in the present embodiment, as shown in FIG. 3, controller 50 causes right front wheel rotation speed command unit 50dR to control first drive source 35R so as to attain the target front wheel rotation speed of right front wheel 11R, and causes left front wheel rotation speed command unit 50dL to control second drive source 35L so as to attain the target front wheel rotation speed of left front wheel 11L. The rotation speed of each of right front wheel 11R and left front wheel 11L can thereby be independently controlled, so that a loss of traction from front wheel 11 is suppressed.

Moreover, in the present embodiment, as shown in FIG. 1, IMU 26 is attached to front frame 22. IMU 26 can thereby be disposed at a position distant from running wheels 11, 12 and work implement 4, so that IMU 26 is not susceptible to failure due to soil and the like.

Moreover, in the present embodiment, as shown in FIG. 2, first drive source 35R includes right hydraulic motor 35MR, and second drive source 35L includes left hydraulic motor 35ML. The rotation speed of right front wheel 11R is thereby controlled by right hydraulic motor 35MR, and the rotation speed of left front wheel 11L is thereby controlled by left hydraulic motor 35ML. Thus, the rotation speed of right front wheel 11R and the rotation speed of left front wheel 11L can be independently controlled.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 motor grader; 2 body frame; 2F front end; 2R rear end; 3 cab; 4 work implement; 6 engine compartment; 7 steering cylinder; 11 front wheel; 11L left front wheel; 11R right front wheel; 12 rear wheel; 12L left rear wheel; 12R right rear wheel; 21 rear frame; 22 front frame; 23 articulation cylinder; 24 articulation center; 25 exterior cover; 26 IMU; 31 engine; 32 transmission; 33 final reduction gear; 34L left tandem device; 34R right tandem device; 35L second drive source; 35ML left hydraulic motor; 35MR right hydraulic motor; 35PL left hydraulic pump; 35PR right hydraulic pump; 35R first drive source; 36 speed sensor; 37L left pump solenoid; 37R right pump solenoid; 38L left motor solenoid; 38R right motor solenoid; 39 articulation sensor; 40 drawbar; 41 swing circle; 42 blade; 44 lift cylinder; 49 hydraulic motor; 50 controller; 50a rear wheel turning radius calculation unit; 50b front wheel turning radius calculation unit; 50c target front wheel rotation speed calculation unit; 50dL left front wheel rotation speed command unit; 50dR right front wheel rotation speed command unit; 50e memory; 51 counterweight; C1 rear wheel center.

The invention claimed is:

1. A work machine comprising:
a right front wheel and a left front wheel;
a front frame provided with the right front wheel and the left front wheel;
a rear wheel;
a rear frame provided with the rear wheel and coupled to the front frame;
a speed sensor that measures a moving speed of the work machine;
a measurement device that measures a turning angular velocity acting on the work machine during movement of the work machine;
an articulation sensor that detects an articulation angle between the front frame and the rear frame;
a first drive source that provides driving force to the right front wheel;
a second drive source that provides driving force to the left front wheel; and
a controller that controls the first drive source and the second drive source based on the moving speed of the work machine measured by the speed sensor and the turning angular velocity measured by the measurement device, to thereby independently control a rotation speed of each of the right front wheel and the left front wheel, wherein
the controller i) calculates a turning radius of the rear wheel based on the moving speed of the work machine measured by the speed sensor and the turning angular velocity measured by the measurement device; ii) determines a target front wheel rotation speed of the right front wheel and a target front wheel rotation speed of the left front wheel based on the calculated turning radius of the rear wheel and the articulation angle detected by the articulation sensor; and iii) controls the first drive source so as to achieve the target front wheel rotational speed of the right front wheel, and controls the second drive source so as to achieve the target front wheel rotational speed of the left front wheel.

2. The work machine according to claim 1, wherein the measurement device is attached to the front frame.

3. The work machine according to claim 1, wherein the first drive source includes a first motor, and the second drive source includes a second motor.

4. A method of controlling a work machine having a right front wheel, a left front wheel, a front frame provided with the right front wheel and the left front wheel, a rear wheel, and a rear frame provided with the rear wheel and coupled to the front frame, the method comprising:

measuring a moving speed of the work machine;

measuring a turning angular velocity acting on the work machine during movement of the work machine;

detecting an articulation angle between the front frame and the rear frame;

independently controlling a rotation speed of each of the right front wheel and the left front wheel based on the measured moving speed and the measured turning angular velocity;

calculating a turning radius of the rear wheel based on the measured moving speed of the work machine and the measured turning angular velocity;

determining a target front wheel rotation speed of the right front wheel and a target front wheel rotation speed of the left front wheel based on the calculated turning radius of the rear wheel and the detected articulation angle;

controlling the first drive source so as to achieve the target front wheel rotational speed of the right front wheel; and controlling the second drive source so as to achieve the target front wheel rotational speed of the left front wheel.

* * * * *